Nov. 14, 1967   D. C. HUNN   3,352,334
POWER SAW MOUNTING APPARATUS
Filed June 22, 1965   5 Sheets-Sheet 1
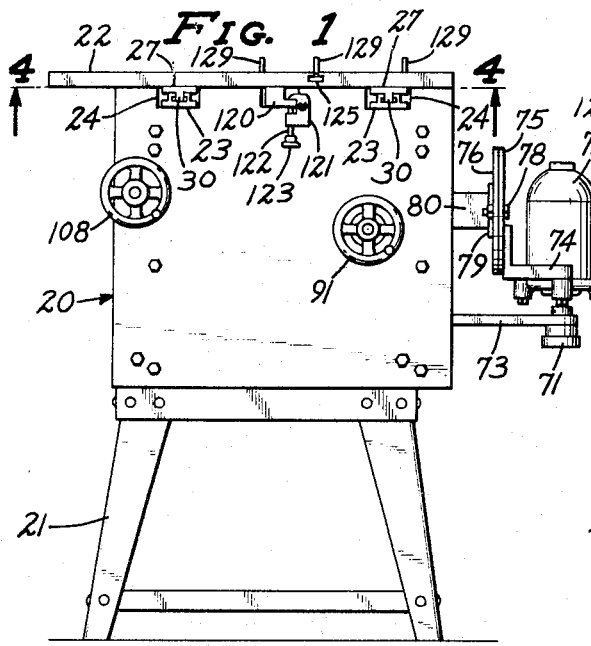
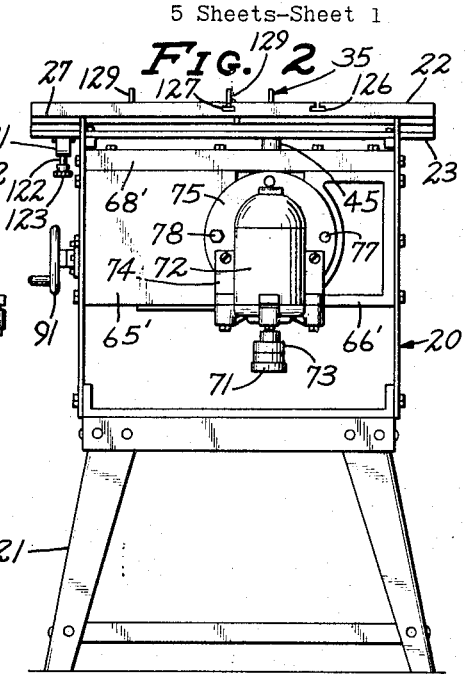
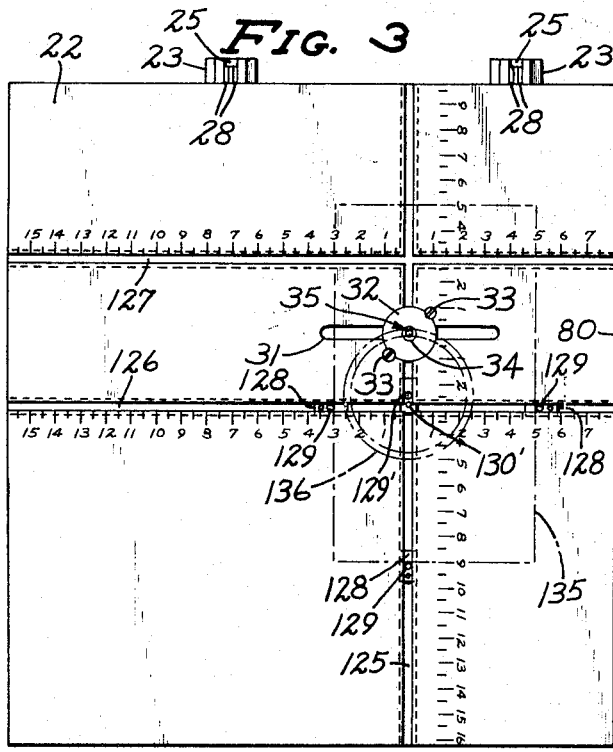
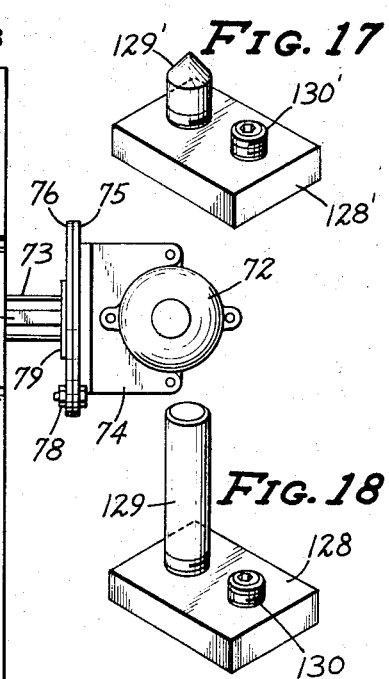
INVENTOR.
DOUGLAS C. HUNN
BY
Merchant, Merchant & Gould
ATTORNEYS

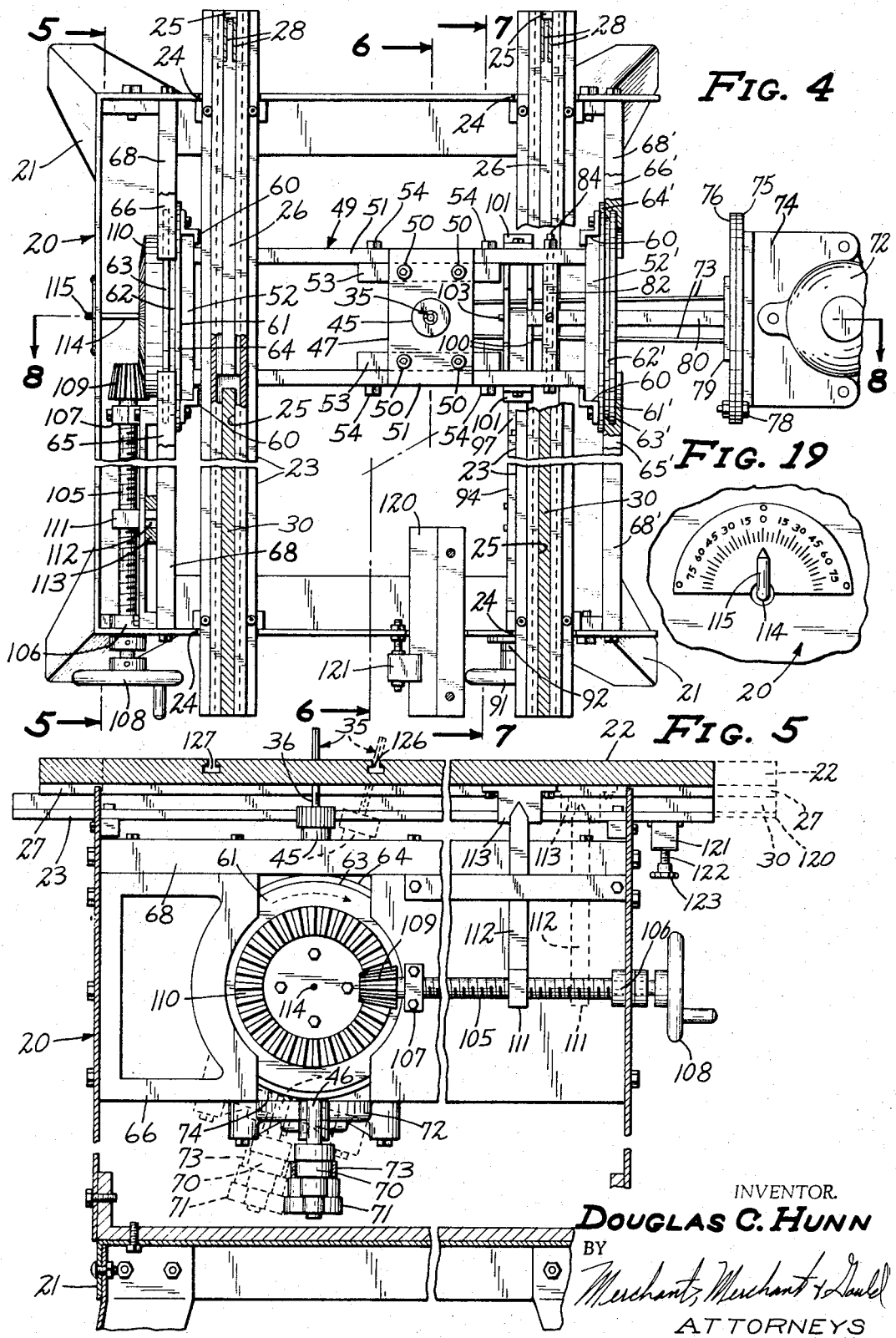

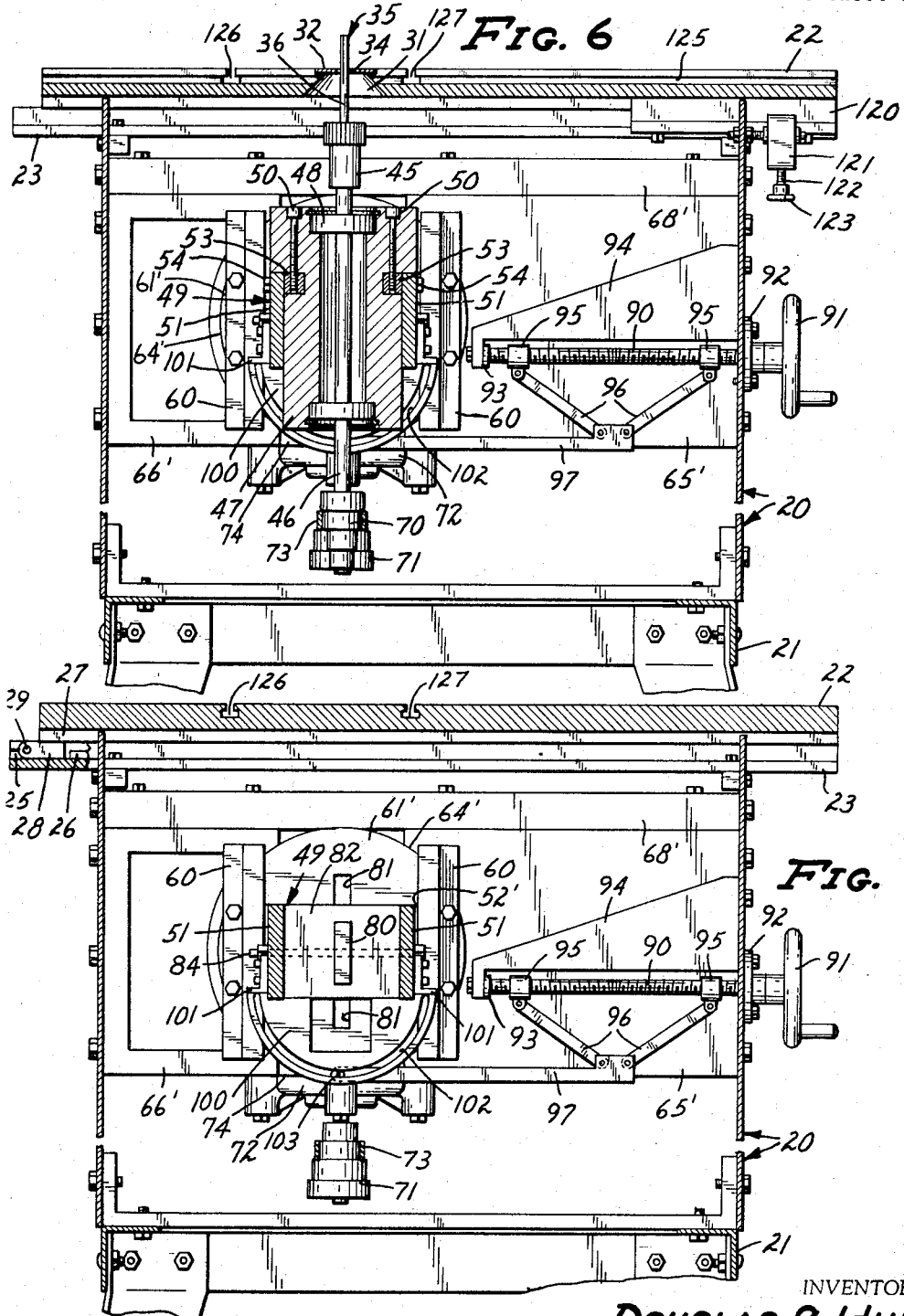

Nov. 14, 1967     D. C. HUNN     3,352,334
POWER SAW MOUNTING APPARATUS
Filed June 22, 1965     5 Sheets-Sheet 4

INVENTOR.
DOUGLAS C. HUNN
BY
Merchant, Merchant & Gould
ATTORNEYS

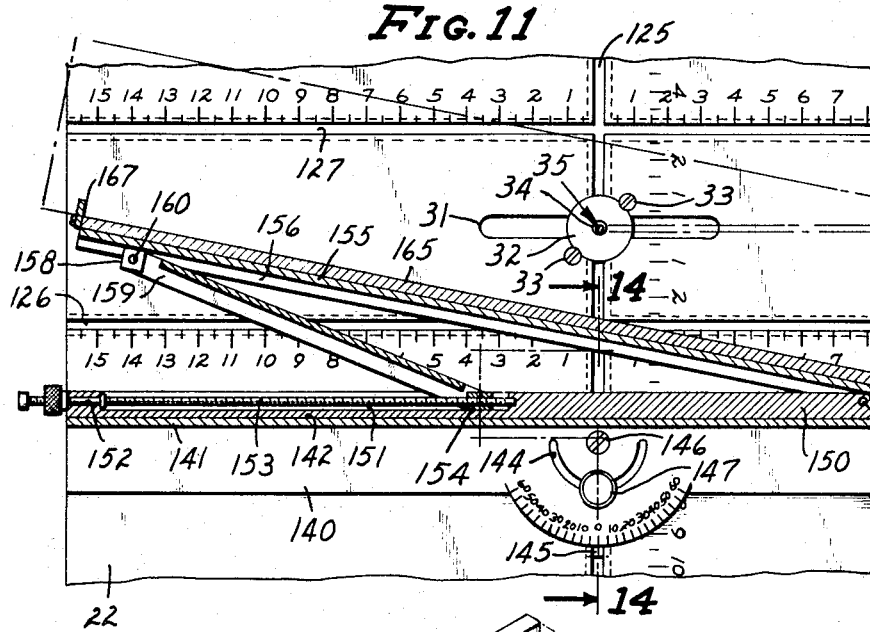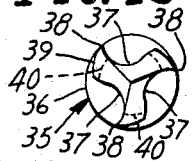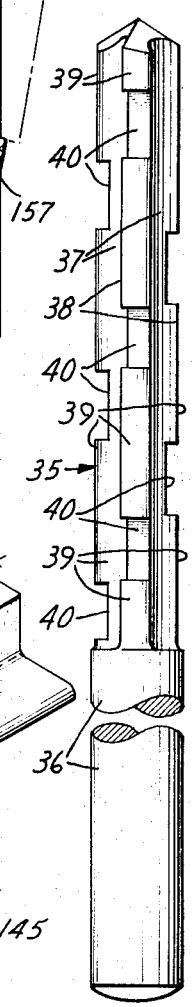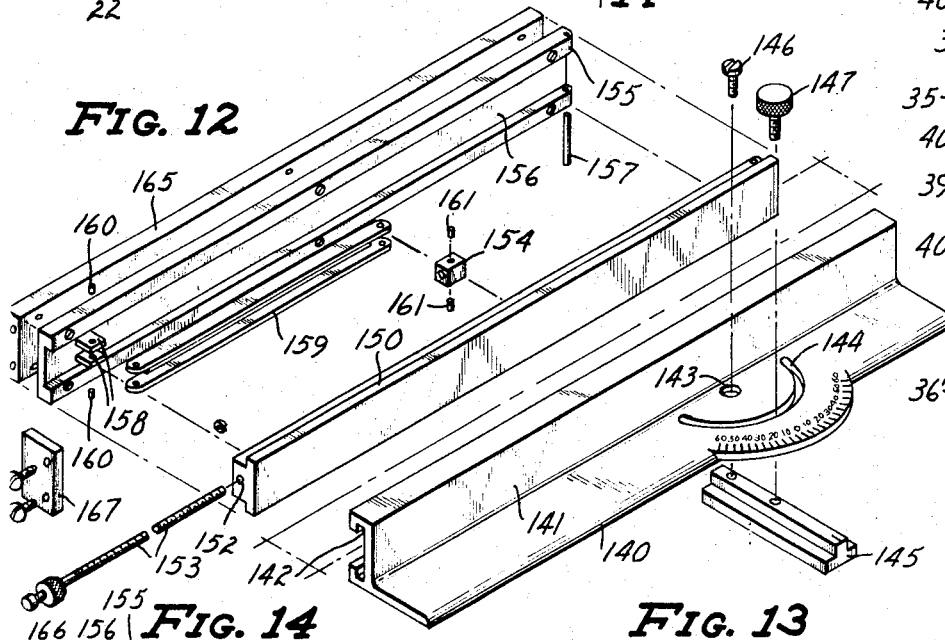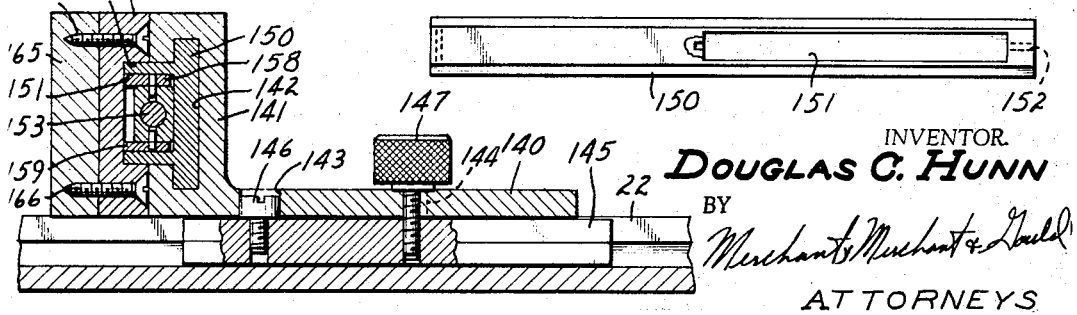

United States Patent Office 3,352,334
Patented Nov. 14, 1967

3,352,334
POWER SAW MOUNTING APPARATUS
Douglas C. Hunn, Minneapolis, Minn., assignor to The Mill-Cut Corporation, a corporation of Minnesota
Filed June 22, 1965, Ser. No. 465,926
5 Claims. (Cl. 144—129)

ABSTRACT OF THE DISCLOSURE

Apparatus for mounting a circular saw or a cutting tool for sawing perpendicular to the axis of the tool, wherein the cutting tool mounting means and the power means rotate adjustably through an arc up to 180° to allow the use of the two different cutting tools and the surface of the apparatus is formed to allow pattern cutting thereon.

---

The present invention pertains to power saw mounting apparatus and more specifically to power saw mounting apparatus having controls for moving the saw vertically or at an angle with the horizontal and for moving the work at any angle relative to an axis, which apparatus is extremely accurate and relatively inexpensive to construct.

In prior art devices the cutting tool and the motor for rotating the cutting tool are mounted on a frame which is attached to the underside of the work surface by means of pins and arcuate grooves. Thus, the frame is pendulously suspended under the work surface for rotation about an axis through the work surface. A threaded shaft having a handle at one end has a traveling member thereon which is rotatably attached to the bottom of the frame. As the handle and shaft are rotated the traveling member moves down the shaft thereby rotating the bottom of the frame and changing the angle which the saw makes with the work surface.

A second handle is utilized to adjust the amount which the saw extends through the work surface and, since this handle is rotatably attached to the frame the outer housing must have an arcuate opening therein to allow the handle to move with the frame.

In the prior art devices if any force is applied to the cutting tool, which is generally a circular saw, along the axis of rotation the angle which the cutting tool makes with the work surface may be changed.

In the present invention an arbor is rotatably mounted on a carriage which is in turn mounted for limited vertical movement. The carriage also has a motor fixedly attached thereto which is operatively engaged with the arbor for rotating the arbor about its longitudinal axis. A chuck is attached to the upper end of the arbor for receiving a cutting tool or the like therein. The cutting tool utilized in this description is designed for high speed rotation about its longitudinal axis and can be utilized for providing smooth cuts along straight or irregular lines in a piece of work.

A threaded shaft having a handle at one end thereof is provided as a control member for raising or lowering the carriage relative to the work surface. This control member is attached to the carriage so that the carriage can rotate with respect thereto without changing the height or affecting the control member in any way. In addition the means mounting the carriage for vertical movement and the carriage are mounted for limited rotational movement about an axis parallel to the work surface. Because this axis is below the work surface the carriage can be mounted for very accurate movement, as opposed to simply swing in a pair of arcuate grooves. This can be seen more clearly when one notes that the frame cannot be mounted at the axis when rotation about an axis through the work surface is desired, since this is impossible, but it must be mounted for rotational movement in arcuate grooves situated at some distance from the axis. Thus, the device is not mounted solidly but actually swings and there is much room for mechanical play in the arcuate grooves greatly decreasing the accuracy of the device. When the device is rotated about the axis on a solid connection, as the carriage in the present saw mounting apparatus, the mechanical play can be eliminated and the accuracy of the device is greatly improved. A control member is attached to the means rotatably mounting the carriage and the operator can rotate the carriage so that the arbor makes any desired angle with the work surface.

Since the axis about which the carriage rotates is located below the surface of the table, when the carriage is rotated the table must be moved slightly so that the tool in the chuck at the end of the arbor remains in an opening in the work surface. In this fashion the work surface remains correctly aligned with the cutting tool and any work mounted on the surface will retain its correct position relative to the cutting tool.

In addition, the work surface has a plurality of perpendicular grooves therein which are adapted to receive adjustable means slidably therein. These adjustable means may be utilized to find any point in the surface of a piece of work so that the piece of work may be moved about the point and a geometrically-shaped cut, such as a circle, can be made. Adjustable guide means are also associated with the slots in the work surface so that a cut may be made in a piece of work at any angle to one of the sides thereof.

It is an object of the present invention to provide an improved power saw mounting apparatus.

It is a further object of the present invention to provide power saw mounting apparatus which is extremely accurate and inexpensive to manufacture.

It is a further object of the present invention to provide power saw mounting apparatus having control members which do not move relative to each other as adjustments are made.

These and other objects of this invention will become apparent to those skilled in the art upon consideration of the accompanying specification, claims, and drawings.

Referring to the drawings, wherein like characters indicate like parts throughout the figures:

FIG. 1 is a view in elevation from one side of the present invention;

FIG. 2 is a view in elevation as seen from the right of FIG. 1 of the present invention;

FIG. 3 is an enlarged view in top plan of the present invention;

FIG. 4 is an enlarged sectional view as seen from the line 4—4 in FIG. 1, parts thereof broken away and shown in section;

FIG. 5 is a sectional view as seen from the line 5—5 in FIG. 4;

FIG. 6 is a sectional view as seen from the irregular line 6—6 in FIG. 4;

FIG. 7 is a sectional view as seen from the line 7—7 in FIG. 4;

FIG. 11 is a sectional view as seen from the line 11—11 in FIG. 10;

FIG. 12 is an exploded view in perspective of the adjustable guide means;

FIG. 13 is a side view of the sliding member in the guide means opposite to the side illustrated in FIG. 12;

FIG. 14 is a sectional view as seen from the line 14—14 of FIG. 11 with the adjustable guide means closed;

FIG. 15 is an end view of the cutting tool;

FIG. 16 is a side view of the cutting tool;

FIG. 17 is a view in perspective of a work holding apparatus;

FIG. 18 is a view in perspective of an adjustable stop element; and

FIG. 19 is a view as seen from the line 19—19 in FIG. 8.

In the figures the numeral 20 generally designates a housing mounted on a stand 21 to maintain it at the proper height. The upper end of the housing 20 is open and a work surface 22, which consists of a rectangular-shaped piece of suitable material such as metal or the like, is mounted in the following manner.

Figure 9:
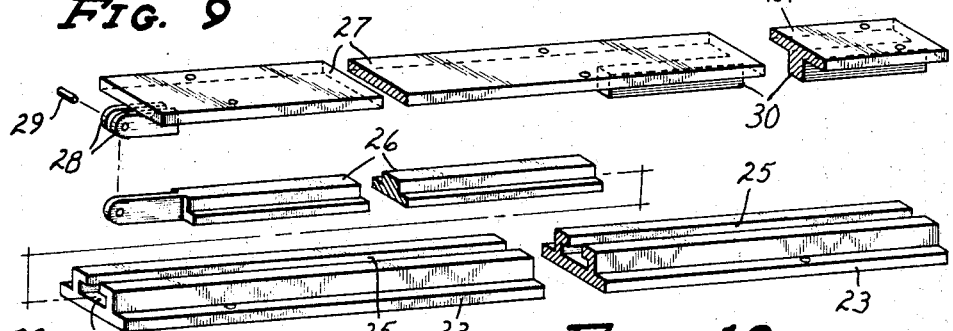
FIG. 9 is an exploded view in perspective of the apparatus for mounting the work surface.
Figure 10:
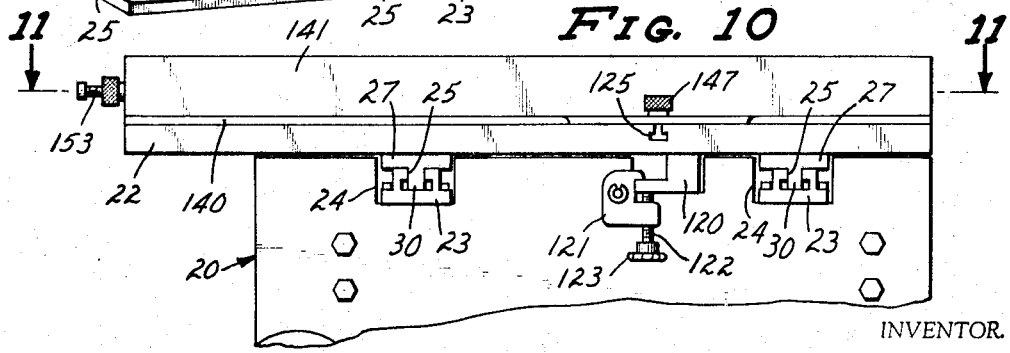
FIG. 10 is an enlarged side elevation of the table with adjustable guide means mounted thereon.

A pair of ways 23, one of which is shown particularly in FIG. 9, are mounted parallel in a horizontal spaced apart relationship in two sets of grooves 24 in the upper edges of the housing 20. The ways 23 each have a guide groove 25 therein which has an inverted T-shaped cross section. An elongated member 26 has an inverted T-shaped cross section over the major portion thereof which is slightly smaller than the inverted T-shaped cross section of the guide groove 25. The member 26 slides freely in the guide groove 25 in a horizontal direction but cannot be lifted out in a vertical direction. The left end of the elongated member 26 has a hole therethrough and is flattened to serve as the center leaf or stationary portion of a hinge.

A flat elongated plate 27, see FIG. 9, has a pair of flat members 28 fixedly attached to the left end thereof which operate as leaves of a hinge and mate with the left end of the member 26 to pivotally attach the plate 27 to the member 26 when a pin 29 is placed in holes in the members 28 and the hole in the left end of the member 26. The flat plate 27 has an elongated portion 30 extending downwardly from the right end thereof which has a rectangular-shaped cross section and fits in the guide groove 25 to prevent lateral movement of the plate 27 but allows axial or vertical movement thereof. The work surface is fixedly attached to the flat plate 27 by some means such as screws or the like which are threaded into the work surface 22 from the underside thereof to leave the upper surface smooth and unmarred. Thus, the work surface 22 can slide horizontally along the ways 23 on the flat plate 27 or it can be pivoted vertically upward on the hinged members described.

Figure 8:
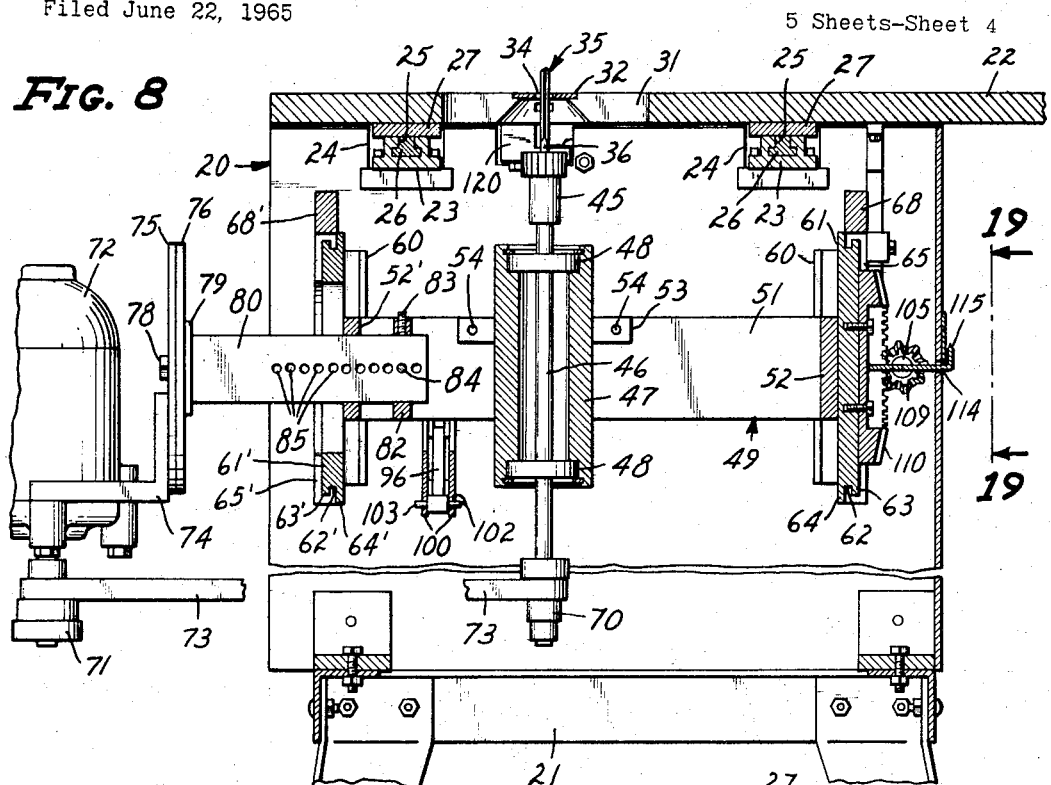
FIG. 8 is a sectional view as seen from the line 8—8 in FIG. 4.

The work surface 22 has an elongated opening 31 with an inverted cross sectionally cone-shaped portion positioned slightly off-center in the upper right hand corner thereof, referring to FIGS. 3, 6, and 8. The opening 31 has a flat circular-shaped disk 32 centrally mounted therein by means of screws 33. The disk-shaped plate 32 has an opening 34 centrally located therein for receiving a tool 35 therethrough. The disk 32 operates as a guide for the tool 35. In this embodiment the tool 35, FIGS. 15, 16, consists of an elongated cylindrical shank 36. The cutting portion of the tool 35 is constructed by machining a plurality of longitudinal grooves 37, in the present embodiment three, having an arcuate-shaped cross section so that each of the longitudinal ridges remaining has a sharpened cutting edge 38 extending in the same direction about the circumference of the tool 35. In addition each of the ridges has a plurality of lands 39 and grooves 40 alternately positioned the length thereof. The lands 39 and grooves 40 of each ridge are also staggered so that the grooves in one ridge match the lands in the next ridge, etc.

The cutting tool 35 is held in position by a chuck 45, FIGS. 6, 8, which is fixedly positioned on the upper end of an arbor 46. The arbor 46 is rotatably mounted by means of a bearing mount 47 having bearings 48 at either end thereof. The arbor 46 rotates about its longitudinal axis coaxially within the bearing mount 47 which is fixedly attached to a carriage generally designated 49 by means of bolts 50.

As seen particularly in FIGS. 4, 6, 7, and 8, the carriage 49 consists of a pair of parallel flat side members 51 horizontally spaced apart and fixedly attached at the left end to a sliding member 52 and at the right end to a sliding member 52', referring to FIG. 4. The sliding members 52 and 52' extend horizontally outwardly a short distance past the members 51 and perpendicular thereto. A short horizontal brace 53 is fixedly attached to the inside upper edge of each of the members 51 by means of bolts 54 and has the bolts 50 threaded into holes in the upper surface thereof, as seen in FIG. 6. The entire carriage 49 is mounted for substantially vertical movement by means of four ways 60 having a somewhat Z-shaped cross section and mounted in parallel spaced apart relationship with each thereof overlapping a vertical outer edge of the sliding members 52 and 52'. Two of the ways 60 cooperate at each end of the carriage 49 to allow vertical movement thereof while substantially preventing any horizontal movement.

The two ways 60 at the left end of the carriage 49, referring to FIG. 4, are fixedly bolted to the inner surface of a disk-shaped member 61. The other periphery of the disk-shaped member 61 has a centrally located groove 62 extending around the circumference thereof with a flange 63 forming the outer edge of the groove 62 and a flange 64, having a slightly larger diameter than the flange 63, forming the inner edge of the groove 62. The disk 61 is mounted for rotation about a horizontal axis parallel with the longitudinal axis of the carriage 49 by means of a pair of somewhat rectangular-shaped support members 65 and 66.

Each of the support members 65 and 66, FIGS. 4, 5, is fixedly attached to a wall of the housing 20 by means of bolts or the like. The inner ends of the support members 65 and 66 are spaced apart and have arcs cut therefrom with a radius slightly smaller than the radius of the flange 63 and coaxial therewith. The inner ends of each of the support members 65 and 66 also have a substantially semi-circular-shaped groove cut therein which has a radius slightly larger than the flange 63 on the outer periphery of the disk 61. An elongated bar 68 is bolted between opposite sides of housing 20 and is also bolted to the upper edges of support members 65 and 66 to prevent any vertical movement thereof. When the two support members 65 and 66 are bolted in position in the housing 20 with the flange 63 of the disk 61 in the grooves therein the two support members 65 and 66 cooperate to maintain the disk 61 rotatable while substantially preventing horizontal or vertical movement thereof.

A disk 61' at the right end of the carriage 49, referring to FIGS. 4, 6, and 7 is constructed and mounted similar to disk 61 and, therefore, prime numbers have been utilized to indicate like parts. Thus, the carriage 49 is mounted for substantially vertical movement in the ways 60 and the carriage 49 including the ways 60 is mounted for rotation about an axis parallel with the longitudinal axis thereof by means of rotatably mounted disks 61 and 61'.

The lower end of the arbor 46 has a plurality of pulleys 70 thereon which cooperate with a plurality of pulleys 71 on the shaft of a motor 72 through a belt 73 to provide the arbor 46 with a plurality of speeds. As seen in FIG. 8 the motor 72 is fixedly attached to a bracket 74 which is in turn attached to a plate 75 by some means such as welding or the like. The plate 75 has a centrally located pin, not shown, which is adapted to be inserted in a centrally located hole in a mating plate 76 so that the motor 72 can readily be rotated thereon. The plates 75 and 76 are held together by means of a pin 77 and a bolt 78, which also prevent undesired rotation.

The plate 76 has a smaller plate 79 fixedly attached thereto and the plate 79 in turn has an elongated bar 80 fixedly attached thereto. The bar 80 extends outwardly from the plates 76 and 79 perpendicular thereto and the disk 61' has a central located opening 81 for receiving the bar 80 therethrough. The opening 81 has a vertical length substantially greater than the bar 80 to allow for vertical movement of the bar 80 therein with the carriage 49. The bar 80 also passes through a centrally located hole in the sliding member 52′ at the left end of the carriage 49, in FIG. 8. The hole in the sliding member 52′ has a cross section substantially equal to the cross section of the bar 80 so that the bar 80 will slide snugly therethrough and lateral movement will be substantially eliminated.

A brace 82, FIGS. 4, 7, and 8, having a hole similar to the hole in 52′ centrally located therein and aligned therewith is fixedly mounted between the two flat side members 51 of the carriage 49 so that the right end of the bar 80 passes through the centrally located hole. The bar 80 is maintained fixedly positioned in the hole in the brace 82 by means of a set screw 83 threaded into the top thereof and bearing upon the upper surface of the bar 80. The bar 80 is further prevented from horizontal sliding movements in the holes through members 82 and 52′ by means of an elongated bolt 84 which passes through the brace 82 horizontally and through a desired hole 85 in the bar 80. A plurality of horizontally spaced apart holes 85 are provided in the bar 80 for tension adjustment of the belt 73.

To manually provide substantially vertical movement of the carriage 49 and the consequent vertical movement of the cutting tool 35 a threaded shaft 90 is provided, see FIGS. 6 and 7, with a handle 91 attached to one end thereof and mounted outside of the housing 20 for convenience. The end of the shaft 90 having the handle 91 thereon passes through the wall of the housing 20 and is rotatably mounted therein by means of a bearing plate 92. The inner end of the shaft 90 is seated in and firmly held in place by a bearing 93 which is held in place and supports the shaft 90 by means of a fillet-shaped support 94 fixedly attached to the wall of the housing 20 by bolts or the like. The shaft 90 is threaded in opposite directions from the center outwardly so that a pair of traveling members 95 threadedly engaged thereon travel in opposite directions down the shaft as the handle 91 is turned. Each of the traveling members 95 has one end of an arm 96 pivotally attached thereto with the other end of the arms 96 pivotally attached to one end of a horizontal rod 97. The two arms 96 are attached to the traveling members 95 and the horizontal arm 97 so that the arm 97 is moved vertically as the handle 91 is rotated.

A pair of semi-circular plates 100, FIGS. 7, 8, are fixedly attached to the underside of the carriage 49 in a parallel horizontally spaced apart relationship. The plates are attached by means of an L-shaped bracket 101 fixedly bolted to the outer sides of the members 51 with one arm extending outwardly along the lower edge thereof and the straight edge of the plates 100 fixedly attached to the underside thereof so the plates 100 extend downwardly in a semi-circular arc perpendicular to the members 51. The plates 100 each have a substantially semi-circular slot 102 therethrough positioned coaxial with the lower edge thereof. The free end of the horizontal rod 97 extends between the plates 100 has a pin 103 passing therethrough and engaged in each of the slots 102 in the plates 100. Thus, as the horizontal rod 97 is moved vertically by manipulation of the handle 91 the carriage 49 is moved vertically also. When the carriage 97 is rotated on the disks 61 and 61′ the pin 103 is free to move in the semi-circular slots 102 and, therefore, the vertical control apparatus 91–97 does not hinder rotation thereof.

Rotation of the carriage 49 is accomplished with the following apparatus, see FIGS. 4, 5, and 8. A threaded shaft 105 is rotatably mounted at one end by means of a bearing 106 fixedly positioned in the wall of the housing 20 and at the other end by means of a bearing 107 attached to the surface of the support member 65. The first end of the shaft 105 passes through the bearing 106 and has a handle 108 attached thereto for manual rotation thereof. The other end of the shaft 105 has a small bevel gear 109 fixedly attached thereto for rotation therewith. A large mating bevel gear 110 is fixedly attached to the outer surface of the disk 61 for coaxial rotation therewith. As previously stated the support members 65 and 66 are horizontally spaced apart and the distance therebetween is sufficient to allow the bevel gear 110 to protrude outwardly therebetween. The bevel gear 110 is mounted coaxial with the disk 61 and the teeth thereon mesh with the teeth on the bevel gear 109 so that rotation of the handle 108 rotates shaft 105, bevel gear 109, bevel gear 110 and consequently carriage 49.

A traveling member 111 is threadedly engaged on the threaded shaft 105 and has a vertical arm 112 fixedly attached thereto. The vertical arm 112 extends upwardly to a rectangular-shaped block 113 which is fixedly attached to the underside of the work surface 22. The arm 112 engages the block 113 in a groove which mates with the upper end of the arm and allows the work surface 22 to be pivoted vertically upwardly as previously explained. As the handle 108 is rotated the traveling member 111 moves on the shaft 105 and the arm 112 engaged in the groove in the block 113 moves the work surface 22 horizontally. Since the carriage 49 rotates about an axis vertically displaced below the work surface 22, as rotation occurs the cutting tool 35 is actually displaced a substantial distance horizontally. To maintain the cutting tool 35 substantially centered in the hole 34 in disk 32 the work surface 22 must move horizontally also. Thus, the horizontal control apparatus 105–113 maintains the work surface 22 properly aligned with respect to the cutting tool 35. A small shaft 114 with an indicator arm 115 attached to the outer end thereof, see FIGS. 4, 8, and 19, is fixedly attached by its inner end to the pinion gear 110 so that the indicator arm 115 rotates coaxially with the pinion gear 110. As shown in FIG. 19 a plurality of precalibrated numbers are positioned about the indicator arm 115 to indicate the angle which the cutting tool 35 makes with the upper side of the work surface 22.

The work surface 22 is locked in its normal or horizontal position by the following apparatus, FIGS. 4, 5, 6, and 10, particularly. An L-shaped member 120 is attached to the underside of the work surface 22 by some means such as screws so that one arm extends downwardly and the other arm extends horizontally outwardly from the lower end thereof. A locking device 121, FIG. 10, which is similar to a C-clamp having an operating handle 123 which closes vice-like jaws, is rotatably mounted to the outer surface of the wall of housing 20 by means of a bolt 122. Locking device 121 is mounted so that the horizontally extended arm of the L-shaped member 120 is positioned in its jaw when the locking device is rotated so the operating handle 123 is in a downward direction. As the handle 123 is rotated the locking device 121 clamps onto the horizontal arm of the L-shaped member 120 thereby preventing the work surface 22 from being raised. To unlock the work surface 22 the handle 123 is rotated until the locking device 121 is no longer clamped onto the L-shaped member 120 at which time the entire locking device 121 is rotated to disengage it from the L-shaped member 120.

The work surface 22 has three grooves therein 125, 126 and 127 each of which has a cross section similar to an inverted T. The grooves open onto the upper side of the work surface 22 and are calibrated in any convenient measuring distances, such as inches, centimeters, etc., as shown in FIG. 3. The groove 125 extends longitudinally the length of the work surface 22 and somewhat to the right of center. The groove 126 extends perpendicular to the groove 125 and is substantially centered while the groove 127 extends perpendicular to the groove 125 and is to the right of the groove 126 as seen from the right edge of the FIG. 3.

FIG. 18 illustrates a block 128 having a pin 129 threaded into the upper surface thereof and a set screw 130 threaded into a hole through the block for locking purposes. The block 128 and pin 129 are of such a size as to slip easily into one of the grooves 125–127 for horizontal movement therealong but substantially no lateral movement. The set screw 130 is included to lock the block 128 at any desired position along the grooves 125–127. Thus, as illustrated in FIG. 3 by utilizing three of the blocks 128 in the grooves 125 and 126 any desired point in a piece of work such as board 135 can be easily obtained.

FIG. 17 illustrates a block 128′ similar to block 128 having a set screw 130′ for locking purposes and a pin 129′ which is much shorter than pin 129 and sharpened at the upper end thereof. For the example illustrated in FIG. 3 the block 128′ would be placed so that the pin 129′ would be nearly at the junction of slots 125 and 126. Thus, once the three blocks 128 are correctly positioned the board 135 would be placed therein and pushed down slightly to impale it on the sharpened pin 129′. The blocks 128 could then be removed and the motor 72 energized. The board 135 is then rotated on the pointed pin 129′ and the cutting tool 35 cuts a circular hole therein as illustrated by the path 136.

In FIGS. 11–14 a guide means is illustrated for holding a piece of work to obtain any desired angle of cut relative to the longitudinal axis of the work surface 22. This guide means consists of a first flat elongated plate 140 with an upright leg member 141 having a T-shaped slot 142 extending the length thereof fixedly attached thereto so that the flat plate 140 and the leg member 141 form a 90° angle with the T-shaped slot 142 extending horizontally along the outer surface of the upright leg. The flat plate 140 has a calibrated angle indicator thereon with a mounting hole 143 and an arcuate angle adjustment slot 144 therein. A bar 145, FIGS. 12, 14, having an inverted T-shaped cross section is adapted to be placed in one of the grooves 125–127 and has a pair of holes therein which match with the hole 143 and the arcuate slot 144. A mounting screw 146 is placed in the hole 143 and threaded into one of the holes in the bar 145 to rotatably mount the flat plate 140 on the work surface 22. A second screw 147 having a knurled knob thereon serves as a manual adjustment when placed in the arcuate slot 144 and threaded into the second hole in the bar 145. When the screw 147 is loose the flat plate 140 may be rotated to any desired angle relative to the bar 145 and when the screw 147 is tightened it will be maintained in that position.

An elongated bar 150 having a T-shaped cross section commensurate with the groove 142 and approximately the same length as the member 141 is adapted to slide inside of the groove 142. The bar 150 has a rectangular-shaped groove 151 in the outwardly extended portion or the base of the T. The bar 150 also has a hole 152 in the right end thereof, as seen in FIG. 13, which extends centrally through the groove 151 and into the bar 150 a short distance on the other side thereof. A threaded shaft 153 is adapted to fit within the hole 152 and has a traveling member 154 thereon. The rod 153 fits in the hole 152 for rotation therein and the traveling member 154 moves from one end of the slot 151 to the other as the rod 153 is rotated.

A flat elongated plate 155 having a centrally located groove 156 extending the length thereof is adapted to fit flush against the bar 150. That is to say the portion which forms the trunk of the T-shaped cross section fits into the groove 156 and the undersides of the cross arms forming the T-shaped cross section butt against the flat surface of the plate 155. The right end of the member 155 has a hole extending vertically therethrough which corresponds to a hole extending through the right end of the rod 150. The two members are pivotally joined together by means of a pin 157 which is fixedly positioned in these holes.

Near the left end of the member 155 a pair of small plates are fixedly attached in the groove 156 in a parallel vertically spaced apart relationship. The plates 158 have a hole in each of them which is vertically aligned to have one end pivotally mounted therebetween by means of pins 160. The other end of the arm 159 is adapted to extend over the upper and lower surface of the traveling member 154 and is pivotally attached thereto by means of pins 161. Thus, as the rod 153 is manually rotated the traveling member 154 moves horizontally in the slot 151 carrying one end of the arm 159 with it. This causes the other end of the arm 159 to move outwardly away from the bar 150 or inwardly toward the bar 150 and the member 155 pivots about the pin 157 in the right end thereof.

The member 155 has a flat rectangular-shaped member 165, which is composed of some soft material such as wood to prevent damage to the cutting tool 35, fixedly attached to the outer surface thereof by some means such as screws 166. A stop 167 is attached to the left end of the member 165 by some means such as screws or the like and is utilized to prevent a piece of work from sliding past the end thereof.

Thus, power saw mounting apparatus have been described with adjustments thereon allowing substantially any angle of cut in a piece of work relative to the work surface. Each of the described adjustments can be constructed extremely accurately because of the novel way in which the mounting apparatus is designed. It should be noted that while a special cutting tool 35 was utilized throughout the description the mounting apparatus can be easily converted for use with a rotary saw blade. Also, the overall device is inexpensive to manufacture and simple to operate.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. Power saw mounting apparatus comprising:
 (a) a flat substantially horizontal work surface mounted on a base for limited horizontal movement in a first direction having an opening therein for the projection of a work tool therethrough;
 (b) a carriage having an arbor mounted thereon and perpendicular thereto with a tool receiving chuck at one end thereof and motor means operatively connected to said arbor for rotation of said arbor;
 (c) first means mounting said carriage for limited vertical movement with said chuck positioned so a tool therein will project substantially through the center of said opening in said work surface;
 (d) first control means attached to said carriage for moving said carriage vertically;
 (e) second means mounting said first mounting means and said carriage for limited rotation about a substantially horizontal axis displaced vertically below said work surface; and
 (f) second control means attached to said carriage and said work surface for rotating said carriage until said arbor makes a desired angle with said work surface while simultaneously moving said work surface in said first direction so the axis of said chuck remains substantially centered in said opening.

2. The power saw mounting apparatus set forth in claim 1 having in addition a high speed rotary cutting tool mounted in the chuck for sawing perpendicular to the plane of the tool.

3. The power saw mounting apparatus set forth in claim 1 having in addition means attaching said first control means to said carriage to allow relative movement therebetween without disturbing the setting of said first control means and without causing movement thereof.

4. The power saw mounting apparatus set forth in claim 1 having in addition adjustable means slidably mounted in the work surface for aiding in ascertaining any desired point in the surface of a piece of work.

5. The power saw mounting apparatus set forth in claim 1 having in addition adjustable, sliding guide means mounted on the work surface for holding a piece of work to obtain any desired angle of cut relative to the longitudinal axis of said work surface.

References Cited

UNITED STATES PATENTS

| | | | |
|---|---|---|---|
| 1,327,390 | 1/1920 | Josias | 144—1 |
| 2,045,422 | 6/1936 | Tautz. | |
| 2,076,511 | 4/1936 | Hedgpeth. | |
| 2,109,061 | 2/1938 | Dietrich. | |

WILLIAM W. DYER, Jr., *Primary Examiner.*

W. D. BRAY, *Assistant Examiner.*